Aug. 17, 1954

R. A. McCALLUM 2,686,457

APPARATUS FOR GENERATING GEARS

Filed Dec. 6, 1949

INVENTOR.
Robert A. McCallum
BY
Clarence F. Poole
ATTORNEY

Aug. 17, 1954     R. A. McCALLUM     2,686,457
APPARATUS FOR GENERATING GEARS

Filed Dec. 6, 1949     4 Sheets-Sheet 3

Fig. 3

INVENTOR.
Robert A. McCallum
BY
Clarence F. Poole
ATTORNEY

Aug. 17, 1954     R. A. McCALLUM     2,686,457
APPARATUS FOR GENERATING GEARS
Filed Dec. 6, 1949                                           4 Sheets—Sheet 4
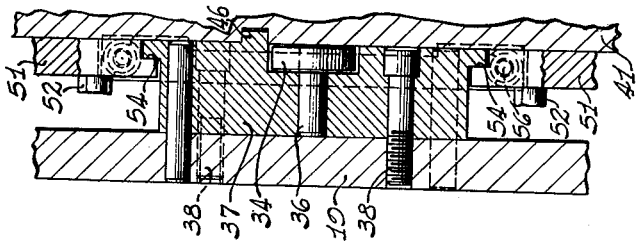
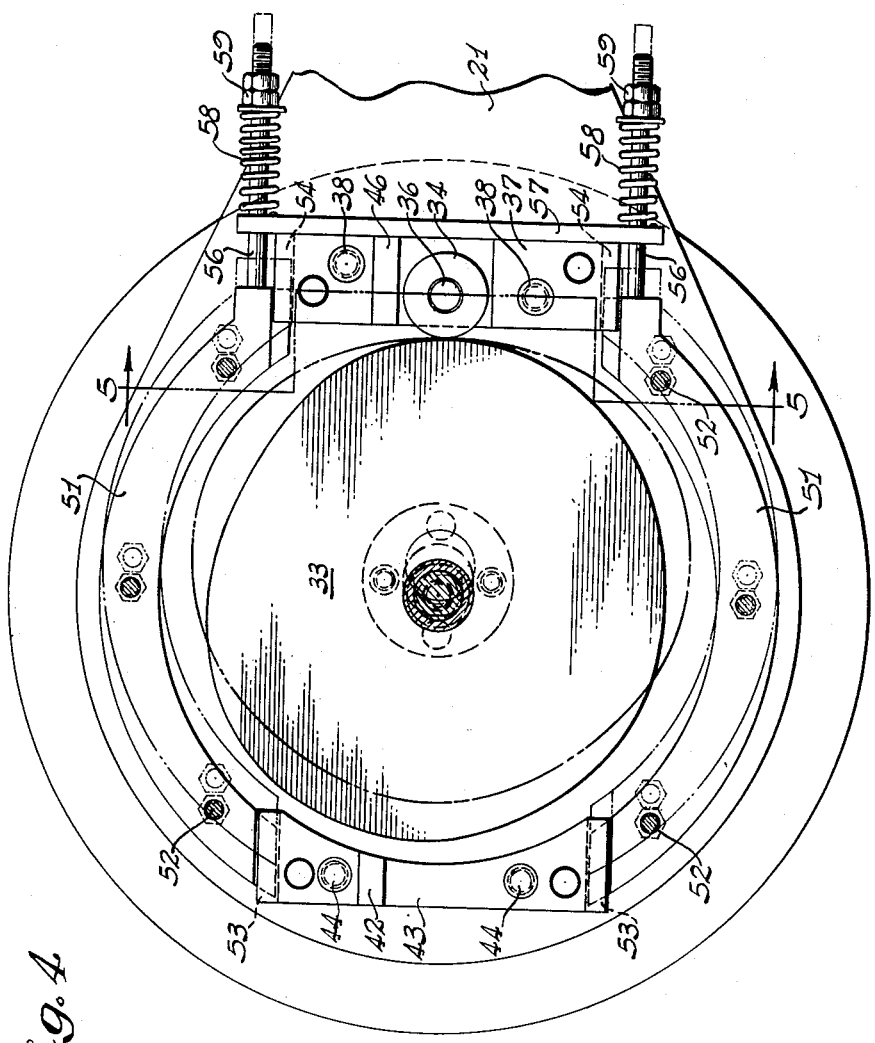
INVENTOR.
Robert A. McCallum
BY
Clarence F. Poole
ATTORNEY Patented Aug. 17, 1954

2,686,457

UNITED STATES PATENT OFFICE 2,686,457

APPARATUS FOR GENERATING GEARS

Robert A. McCallum, Clarendon Hills, Ill., assignor to Goodman Manufacturing Company, Chicago, Ill., a corporation of Illinois Application December 6, 1949, Serial No. 131,313

4 Claims. (Cl. 90—7)

This invention relates to improvements in apparatus for generating gears, and relates particularly to improvements in machines for generating varying speed gears having varying curvilinear pitch and varying pitch radius, or for generating varying speed gears having constant curvilinear pitch and varying pitch radius.

In an application of William W. Sloane, Serial No. 123,581, filed October 26, 1949, Patent No. 2,565,528, August 28, 1951, for Improvements in Mechanical Miners, there is shown varying speed gearing for imparting changing speed of a pair of cranks or shafts relative to each other, the gears so shown being characterized by being eccentrically mounted and having constant curvilinear pitch and a varying pitch radius. In an application of William W. Sloane, Serial No. 702,724, filed October 11, 1946, Patent No. 2,585,971, February 19, 1952, for Improvements in Gearing, there is disclosed a novel form of varying speed gearing in which the speed variations are attained by modifying the gear teeth so that the matching pinion will contact the gear teeth at varying points with respect to the tips and roots of the gears and pinions.

Such gears may be manufactured by apparatus as disclosed in Hlinsky application Serial No. 711,745, filed November 22, 1946, Patent No. 2,602,374, July 8, 1952, Improvements in Apparatus for Producing Varying Speed Gearing, or in Holstein application Serial No. 733,839, filed March 11, 1947, Patent No. 2,616,336, November 4, 1952, for Methods and Apparatus for Producing Varying Speed Gearing, or in Millhuff application Serial No. 122,045, filed October 18, 1949, Patent No. 2,649,716, August 25, 1953, for Improvements in Apparatus for Generating Gears.

According to the present invention it is possible to fabricate a varying speed gear having constant curvilinear pitch and varying pitch radius or a varying speed gear having varying curvilinear pitch and varying pitch radius. According to the present invention it is also possible to fabricate a varying speed gear having constant curvilinear pitch and adapted to run eccentrically with a mating eccentrically mounted gear, such a gear being fabricated by means of a pinion-shaped cutter which is mounted concentrically and of a size different from the mating eccentric gear.

With the foregoing considerations in mind it is a principal object of the invention to afford apparatus for fabricating varying speed gearing by a gear shaper employing a pinion-shaped cutter for shaping of a finished gear from a gear blank.

Another object is to provide apparatus for use with a gear shaper so constructed and arranged as to enable a varying speed gear to be fabricated with a standard pinion-shaped cutter, and to support a gear blank by means of such apparatus for both rotative and radial movement thereof with respect to the work spindle of the gear shaper, such rotative and radial movement providing for proper working distance with respect to the pinion-shaped cutter.

Still another object is to afford apparatus for use with a gear shaper to fabricate a varying speed gear, such apparatus being characterized by a pair of cams cooperating with cam followers for advancing or retarding the gear blank with respect to the work spindle and for moving the gear blank radially with respect to the work spindle to the end that a standard reciprocating and rotating pinion-shaped cutter may be employed to operate on the gear blank and produce a varying speed gear as desired.

Yet another object comprehends the provision of a plurality of floating cams for moving a gear blank to be acted upon by a shaping cutter in a gear shaper, the two floating cams being connected together but having rotative movement relative to each other, one of the cams being adapted to cooperate with a stationary cam follower to move both of the floating cams radially, and the other of the cams being held against rotation and adapted to cooperate with a moving cam follower connected to the gear blank to advance or retard the gear blank rotatively while the gear blank is also moved radially through the instrumentality of the first mentioned cam.

Other objects and important features of the invention will be apparent from a study of the following description taken together with the drawings which illustrate an embodiment that the invention has assumed in practice, and what is now considered to be the best mode of applying the principles thereof. While the invention is described in terms of what is considered a preferred embodiment thereof, its scope is not intended to be limited in terms of the embodiment shown nor otherwise than by the terms of the subjoined claims.

In the drawings:

Fig. 3 is a plan view of a cam for controlling the advancing and retarding rotative movement of the gear blank shown in Fig. 2, taken on a plane indicated by the line 3—3 of Fig. 2 and looking in the direction of the arrows;

Fig. 4 is a plan view taken along the line 4—4 of Fig. 2 looking in the direction of the arrows, and showing details of a cam for controlling the radial movement of the gear blank shown in Fig. 2;

Fig. 5 is a section taken along the line 5—5 of Fig. 4 looking in the direction of the arrows;

Fig. 6 is a plan view of a coupling member looking in the direction of the arrows 6—6 of Fig. 2; and Fig. 7 is a section taken along the line 7—7 of Fig. 6.

Figure 1:
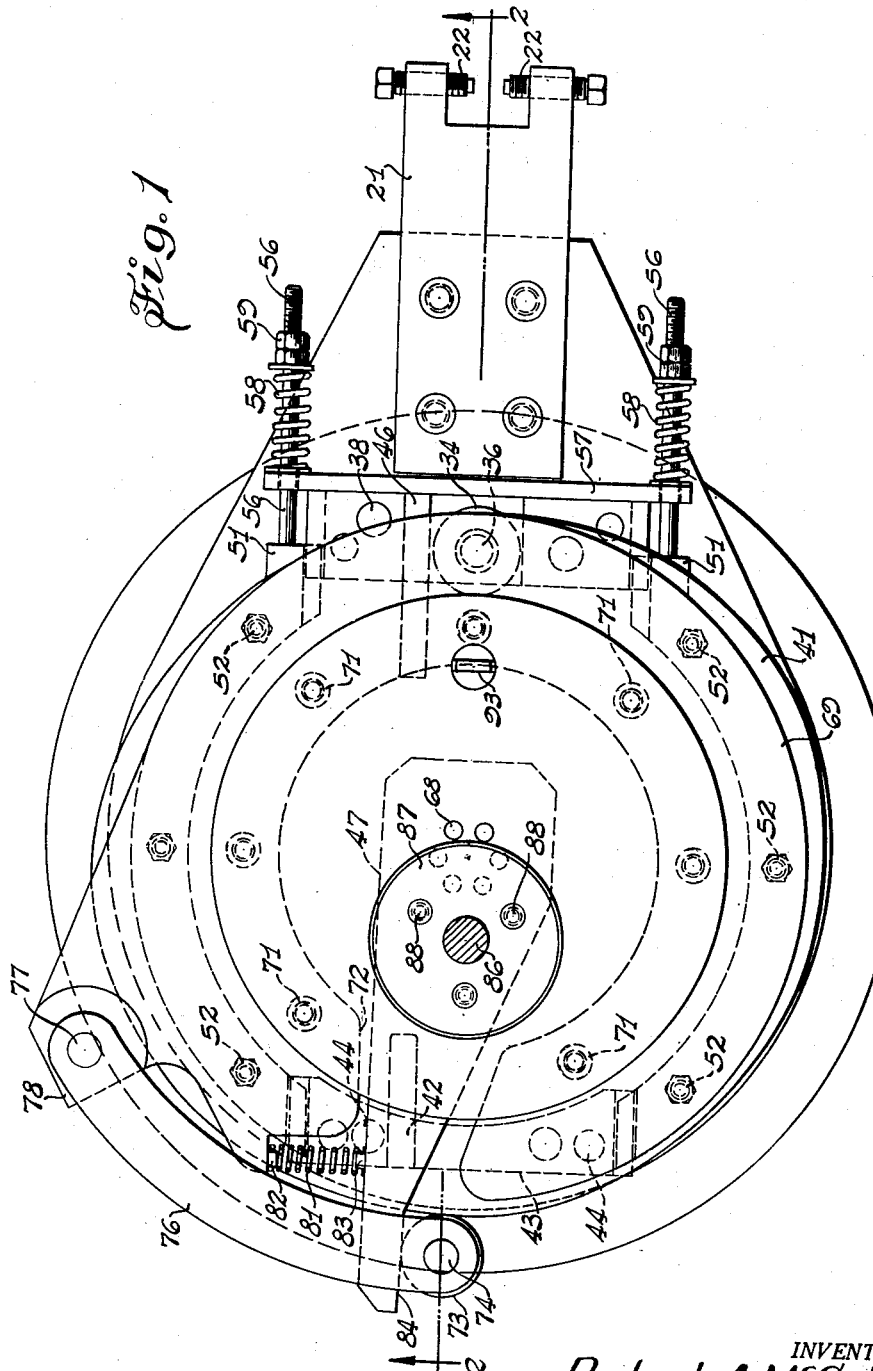
Fig. 1 is a plan view of a gear shaping fixture embodied in the present invention.
Figure 2:
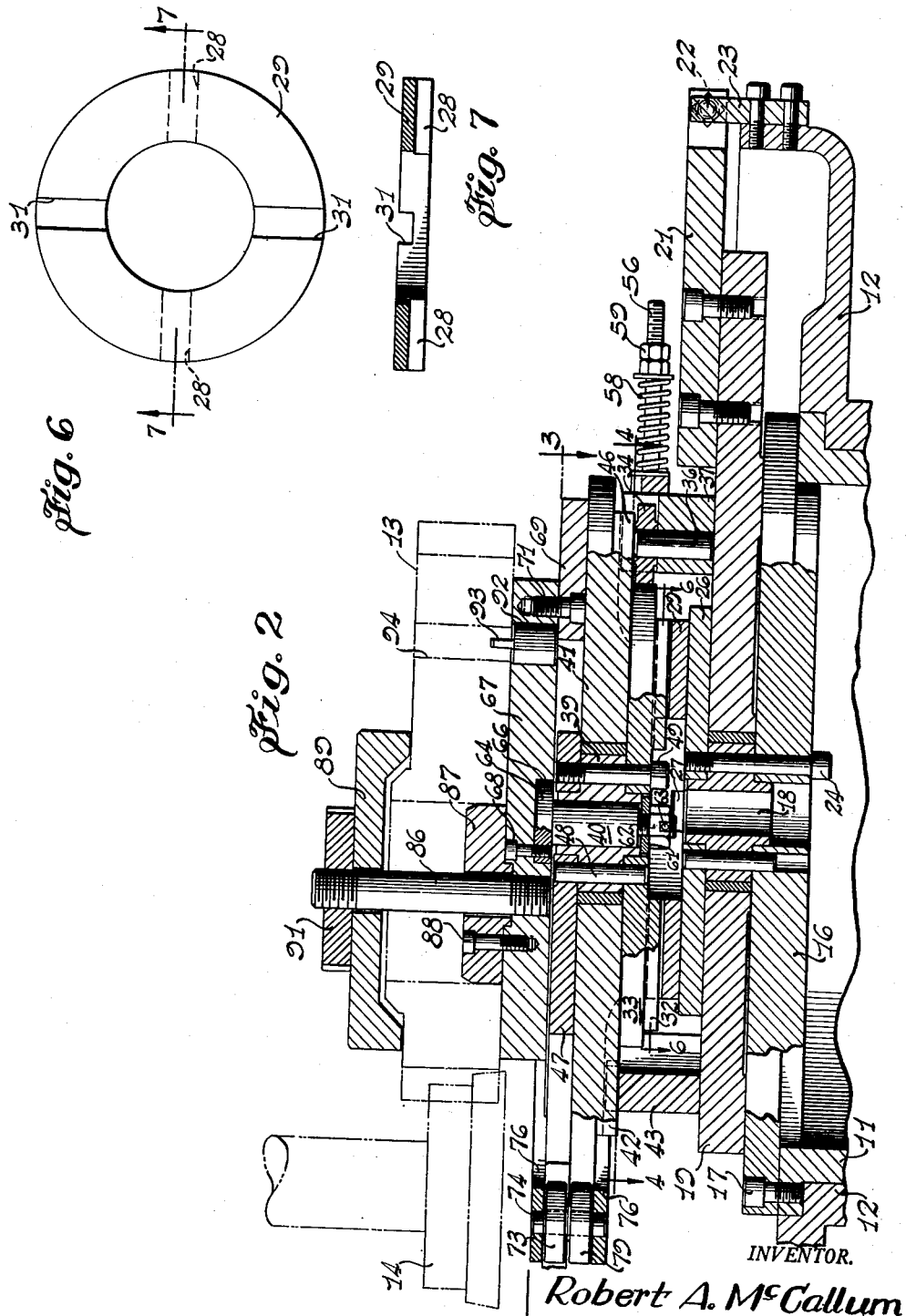
Fig. 2 is a transverse section through the fixture of Fig. 1, taken along the line 2—2 in Fig. 1 and looking in the direction of the arrows, and showing in phantom outline a pinion-shaped cutter adapted to act upon a gear blank, shown also in phantom outline, mounted on the fixture.

Referring now to the drawings, the gear shaping fixture according to the present invention is shown as applied to a machine tool gear shaper. Such a shaper may include a cylindrical rotating work spindle 11 adapted to turn at constant speed in a bed 12. The work spindle 11 cooperates with mechanism to be described, to impart both rotative and radial movement to a gear blank 13 which is acted upon by a reciprocating pinion-shaped cutter 14 which also rotates at a constant speed at a fixed ratio with respect to the work spindle 11, to generate a gear from the gear blank 13 having varying speed characteristics as determined by the curvilinear pitch and the pitch radius of the finished gear.

The cylindrical work spindle 11 is provided with an end closure plate 16 which is held to the work spindle by socket head screws 17. The closure plate 16 is formed with a concentric bushed spindle 18 to turn in a bushing plate 19 held against rotation by an arm 21 adjustable in position with the bushing plate 19 by adjusting screws 22 which bear against a lug 23 secured to the bed 12.

The bushing 18 is held in position by socket head screws 24 which thread into a load transmitting member 26 having radially extending keys 27 which cooperate with keyways 28 formed in an Oldham-type coupling 29 which rests upon the load transmitting member 26.

The coupling 29 is provided with radially extending keyways 31, which are spaced angularly with respect to the keyways 28, and which cooperate with radially extending keys 32 formed integrally with a cam 33. As shown in Figure 4, the cam 33 is adapted to cooperate with a stationary cam follower 34 journaled on a pin 36 which is pressed in a support 37 secured by screws 38 to the bushing plate 19. The cam 33 is provided with a spindle 39 which is adapted to rotate with respect to a bushed cam 41 which is held against rotation but adapted to have radial movement with respect to the work spindle 11 by means of a sliding gibbed connection 42 to a pedestal 43. As shown with particular reference to Fig. 1, the pedestal 43 is held by a plurality of bolts 44, 44 to the bushing plate 19. The cam 41 is likewise provided with a sliding key fitted to the support 37 as at 46. The cam 33 and the cam 41 are held together by a drag arm 47 by means of a plurality of liner pins 48 and socket head screws 49.

It will be apparent from the foregoing description that both rotative and translative movement of the cam 33 and the drag arm 47 will be afforded by means of the coupling 29, and that the cam 41 will have only a translative or radial movement while being held against rotation through the medium of the keys 42 and 46.

In order to insure that the cam 33 will be forced to bear against the cam roller 34 at all times, and that the cam 41 will likewise be prevented from having unintended movement, as might be occasioned by the failure of the cam roller 34 to engage the cam 33, the pedestal 43 provides a sliding gibbed connection with a pair of yoke arms 51 which are bolted as at 52 to the underside of the cam 41. As seen in Figure 4, the left ends of the yoke arms 51 are adapted to move in gibs 53 formed in the pedestal 43, and the right ends thereof, as seen in Fig. 4, are also adapted to move in gibs 54 formed in the extremities of the support 37. The yoke arms 51 are each provided with a stud 56 which supports a strap 57 adapted to abut the support 37. As shown in Fig. 4, each stud 56 is encircled by a spring 58 adjusted in tension by adjusting nuts 59 threaded thereto. It will be apparent that the load in the spring 58 constantly tends to move the cam 41 to the right together with the cam 33 so that the cam 33 will be in engagement at all times with the cam follower 34.

A spindle 40 is adapted to turn freely within the spindle 39 and is held against endwise movement with respect thereto by means of a washer 61 and a castellated nut 62, which is held in position by a cotter key 63. The spindle 40 is provided with a cap 64 which fits within a recess 66 of a gear blank support 67. The spindle 40 and the gear support 67 are held together by a plurality of socket head screws 68. The gear blank support 67 is additionally supported on a split ring 69 which in turn rests upon the cam 41. The gear blank support 67 is held to the split ring 69 by means of a plurality of socket head screws 71. The split ring 69 defines an opening 72 for the drag arm 47, which extends beyond the peripheral limits of the cam 41 and engages a roller 73 which freely turns on a pin 74 mounted on the end of a cam follower arm 76, which is hinged as at 77 to an arm 78 formed integrally with the split support ring 69. The pin 74 also provides a journal for a cam roller 79 which engages the periphery of the cam 41.

In order to insure that the drag arm 47 is in contact at all times with the roller 73, a spring 81 is provided, one end of which abuts the split ring 69 as at 82, the other end of which abuts the drag arm 47 as at 83. It may be noted that the drag arm 47 is provided with a flat surface 84 which is so disposed with the instantaneous center of rotation of the arm 47 that a slight amount of wedging action is provided between the surface 84 and the cam roller 73, so that the cam roller 73 is constantly forced against the periphery of the cam 41.

It will be noted that as the drag arm 47 rotates with the cam 33, and maintains the cam roller 79 in firm contact with the periphery of the cam 41, the change in contour of the cam 41 will cause the support 69 to retard and advance rotationally with respect to the drag arm 47 and the cam 33, and since the split support 69 is connected to the gear blank support 67, it likewise will be advanced or retarded rotationally with respect to the arm 47 and the cam 33.

The gear blank support 67 is provided with a stud 86, which is concentric with a locating boss 87 held to the gear blank support 67 by socket head screws 88. The gear blank 13 is thus held in position by the locating boss 87, the pin 86, and a retaining washer 89, which is held in firm engagement with the gear blank 13 by means of a spanner nut 91 threaded to the stud 86. In order to locate the gear blank 13 properly the gear blank support 67 is provided with a recess 92 for a locating pin 93 adapted to extend into a locating hole 94 formed in the gear blank 13.

It may be noted from the foregoing description that the gear blank 13 is adapted to have both radial movement with respect to the work spindle 11 and rotational movement at rates which vary with respect to the speed of rotation of the work spindle 11. Through the medium of the coupling 29 and the contour of the cam 33 translative movement will be afforded to both the drag arm 47 and the cam 41. However, since the cam 41 is held against rotation, it has only the translative or radial movement afforded by the cam 33 and the coupling 29, but the drag arm 47 will have rotative movement corresponding to the rotative movement of the work spindle 11. The drag arm 47 constantly applies rotative movement against the idler roller 73, but the amount of that movement reflected into the rotative movement of the gear blank support 67, is affected by the contour of the cam 41, and according to the contour of the cam 41 the gear blank support 67 will be advanced or retarded.

From the foregoing description it will be apparent that it is possible to generate an eccentric gear by means of a gear shaper employing a standard shape pinion cutter, and to provide in the finished gear both varying pitch radius and varying curvilinear pitch, as desired. According to the contour of the cams 33 and 41 the gears generated by the fixture according to the present invention may be made to run with a pinion of different size from the pinion-shaped cutter employed in the shaping operation.

While the invention has been described in terms of a preferred embodiment thereof, its scope is not intended to be limited in terms of the embodiment shown nor otherwise than by the terms of the subjoined claims.

I claim as my invention:

1. In a gear shaper for generating a varying speed gear by reciprocating movement of a rotating pinion-shaped cutter with respect to a rotatably driven gear blank, a work spindle driven at a fixed speed relative to said rotating cutter, a support for said gear blank adapted to have both rotative and radial movement with respect to said work spindle in accordance with the curvilinear pitch and the pitch radius of the finished gear, means for advancing or retarding the rotative movement of said support with respect to said work spindle in accordance with the curvilinear pitch of the finished gear, and means for moving the support radially with respect to said work spindle in accordance with the pitch radius of the finished gear comprising a cam adapted to rotate with said work spindle, and a stationary member in contact with said cam for effecting radial movement of said cam and said gear support.

2. In a gear shaper for generating a varying speed gear by reciprocating movement of a rotating pinion-shaped cutter with respect to a rotatably driven gear blank, a work spindle driven at a fixed speed relative to said rotating cutter, a support for said gear blank adapted to have both rotative and radial movement with respect to said work spindle in accordance with the curvilinear pitch and the pitch radius of the finished gear, means for advancing or retarding the rotative movement of said support with respect to said work spindle in accordance with the curvilinear pitch of the finished gear, and means for moving the support radially with respect to said work spindle in accordance with the pitch radius of the finished gear comprising a cam adapted to rotate with said work spindle, and a stationary cam follower for moving said cam radially with respect to said work spindle, and coupling means between said work spindle and said cam comprising a load transmitting member having a radially extending load transmitting connection with said work spindle and having a radially extending load transmitting connection with said cam, said first and second named radially extending load transmitting connections being spaced angularly with respect to each other.

3. In a gear shaper for generating a varying speed gear by reciprocating movement of a rotating pinion-shaped cutter with respect to a rotatably driven gear blank, a work spindle driven at a fixed speed relative to said rotating cutter, a support for said gear blank adapted to have both rotative and radial movement with respect to said work spindle in accordance with the curvilinear pitch and the pitch radius of the finished gear, means for moving the support radially with respect to said work spindle in accordance iwth the pitch radius of the finished gear, and means for advancing or retarding the rotative movement of said support with respect to said work spindle in accordance with the curvilinear pitch of the finished gear comprising a cam held against rotation and adapted to move radially with the support, and a cam follower cooperating with said cam and having an operative connection with said support.

4. In a gear shaper for generating a varying speed gear by reciprocating movement of a rotating pinion-shaped cutter with respect to a rotatably driven gear blank, a work spindle driven at a fixed speed relative to said rotating cutter, a support for said gear blank adapted to have both rotative and radial movement with respect to said work spindle in accordance with the curvilinear pitch and the pitch radius of the finished gear, means comprising a cam adapted to rotate with said work spindle and to have radial movement with respect thereto for moving said work support radially with respect to said work spindle in accordance with the pitch radius of the finished gear, coupling means between said work spindle and said cam comprising a load transmitting member having a radially extending load transmitting connection with said work spindle and having a radially extending load transmitting connection with said cam, said first and second named radially extending load transmitting connections being spaced angularly with respect to each other, and means for advancing or retarding the rotative movement of said support with respect to said work spindle in accordance with the curvilinear pitch of the finished gear comprising a cam held against rotation and a cam follower cooperating with said cam and having an operative connection with said support.

References Cited in the file of this patent

UNITED STATES PATENTS

| Number | Name | Date |
|---|---|---|
| 1,177,503 | Fellows | Mar. 28, 1916 |
| 1,190,390 | Fellows | July 11, 1916 |
| 2,221,827 | Wildhaber | Nov. 19, 1940 |
| 2,616,336 | Holstein | Nov. 4, 1952 |

FOREIGN PATENTS

| Number | Country | Date |
|---|---|---|
| 552,348 | Great Britain | Apr. 2, 1943 |